United States Patent [19]

Tsuchiya et al.

[11] Patent Number: 4,705,397
[45] Date of Patent: Nov. 10, 1987

[54] LASER PULSE TRAIN JITTER MEASURING DEVICE

[75] Inventors: Yutaka Tsuchiya; Shinichirou Aoshima; Akira Takeshima, all of Shizuoka, Japan

[73] Assignee: Hamamatsu Photonics Kabushiki Kaisha, Shizuoka, Japan

[21] Appl. No.: 844,962

[22] Filed: Mar. 27, 1986

[30] Foreign Application Priority Data

Mar. 28, 1985 [JP] Japan ................. 60-64094

[51] Int. Cl.$^4$ ............. G01B 9/02; G01J 3/45
[52] U.S. Cl. .................... 356/345; 307/427; 356/346
[58] Field of Search ........... 356/345, 346; 307/427

[56] References Cited

U.S. PATENT DOCUMENTS 4,406,542 9/1983 Boggy et al. ................ 356/345

OTHER PUBLICATIONS

Shah et al., "Interferometric Studies of Mode-Locked Nd$^{3+}$: Gloss Lasers", *IEEE J. Quant. Elec.*, vol. QE-11, No. 9, pp. 783-788, 9/75.

Fork et al., "Real-Time Intensity Interferometer", *Applied Optics*, vol. 17, No. 22, pp. 3534-3535, 11/78.

Harde, et al., "Rapid Scanning Autocorrelator for Measurements of Picosecond Laser Pulses", *Optics Communications*, vol.-38, No.-3, pp. 211-216, 8/81.

*Primary Examiner*—David L. Willis
*Assistant Examiner*—Matthew W. Koren
*Attorney, Agent, or Firm*—Finnegan, Henderson, Farabow, Garrett and Dunner

[57] ABSTRACT

A laser pulse train jitter measuring device includes a first optical path having a length set at a first value or a second value and a second optical path having a length variable between a first value and a second value. A laser beam is split into a first beam directed to the first optical path and a second beam directed to the second optical path. The split beams are recombined into a correlated beam and recorded as visible images so that jitter in the laser beam can be detected from the differences in the recordings when the first optical path has its first length while the second optical path is varied between the first value and the second value from when the first optical path has its second length while the second optical path is varied between the first value and the second value.

10 Claims, 10 Drawing Figures

LASER PULSE TRAIN JITTER MEASURING DEVICE

FIELD OF THE INVENTION

This invention relates to a laser pulse train jitter measuring device for measuring the degree of fluctuation of a laser pulse train from its regular position, i.e., the degree of so-called "jitter" of a laser pulse train.

DESCRIPTION OF THE PRIOR ART

A laser pulse train jitter measuring device may employ a method in which a repetitive laser pulse train is measured with a synchro scan streak camera, and the streak image is utilized to analyze the jitter.

That is, the synchro scan streak tube is operated with a repetitive sweep waveform signal that is synchronous with a laser beam adapted to a dye laser. The image of the dye laser pulse applied to the photo-electric surface of the synchro scan streak tube is obtained on the fluorescent surface. If, in this case, the dye laser pulse jitters, the streak images superposed on the fluorescent surface spread. Therefore, the degree of spread can be utilized to estimate the degree of jitter of the dye laser pulse train.

The above-described jitter measuring method is based on the premise that the repetitive sweep waveform for the synchro scan streak tube is correct. Therefore, if the sweep timing is shifted causing a so-called "trigger jitter" to occur, then the content including the amount of sweep timing shift is analyzed incorrectly.

OBJECT AND SUMMARY OF THE INVENTION

An object of this invention is to provide a laser pulse train jitter measuring device that enables the accurate measurement of the jitter of a laser pulse train.

The above and other objects are attained by a laser pulse train jitter measuring device comprising a source of a laser beam to be measured for jitter, a first optical path, a second optical path, means for receiving the laser beam from the source and for splitting the laser beam into a first split beam directed to the first optical path and a second split beam directed to the second optical path, means for setting the first optical path to a first path length or a second path length, means for varying the length of the second optical path from a first value to a second value, means for producing a correlated beam by recombining the first split beam and the second split beam after the first split beam has traversed the first optical path and the second split beam has traversed the second optical path, means for providing the second harmonic of the correlated beam, means for producing a photo-electric signal corresponding to the second harmonic of the correlated beam, and recording means for producing a first recording of the photo-electric signal corresponding to the correlated beam produced when the first optical path has the first path length while the length of the second optical path is varied from the first value to the second value, and a second recording of the photo-electric signal corresponding to the correlated beam produced when the first optical path has the second path length while the length of the second optical path is varied from the first value to the second value, whereby comparison of the first recording and the second recording enables the measurement of jitter in the laser beam.

BRIEF DESCRIPTION OF THE DRAWINGS

The manner by which the above objects and other objects, features, and advantages of the present invention are attained will become fully apparent from the following detailed description when it is considered in view of the drawings, wherein.

DETAILED DESCRIPTION

Figure 1:
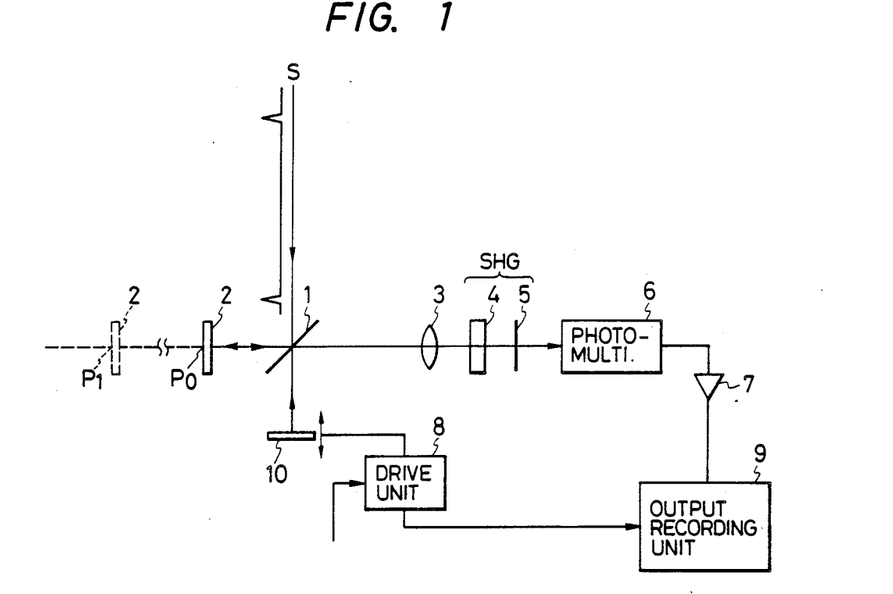
FIG. 1 is an optical path diagram illustrating one example of a laser pulse train jitter measuring device of the present invention.

FIG. 1 is an optical path diagram showing one example of a laser pulse train jitter measuring device according to the present invention.

A light beam (with an angular frequency $\omega$) is emitted from a laser pulse train source S providing a laser pulse train to be measured. The laser pulse train is divided into two parts by a half-mirror 1. One of the two parts is totally reflected by a total reflection mirror 2. The total reflection mirror 2 can take positions $P_0$ or $P_1$ as shown in FIG. 1. When the mirror 2 is at the position $P_0$, a first optical path system of the device is formed. When the mirror 2 is at the position $P_1$, a second optical path system of the device is provided.

The other part of the light beam is reflected by a total reflection mirror 10 and then by the half mirror 1.

The total reflection mirror 10 serves as an adjusting means for the first and second optical path systems, and can be moved vertically (in FIG. 1) within a predetermined range by adjusting means drive unit 8. The position of the total reflection mirror 10 is applied to an output recording unit 9, where a photo-electric conversion output is recorded in response to the input.

The two parts of the light beam are recombined by means of the mirrors 1, 2, and 10. The resultant light beam is applied to a lens 3 and an optical crystal 4 such as ADP ($NH_4H_2PO_4$—ammonium dihydrogen phosphate).

The light beam that is passed through the optical crystal 4 includes the original wave length component (angular frequency $\omega$) and the second harmonic component (angular frequency $2\omega$).

When the light beam passes through an interference filter, only the component having an angular frequency $2\omega$ is passed out. Hereinafter, such a device for providing only the component having an angular frequency of $2\omega$ will be referred to as an "SHG" (second harmonic generator). The light beam provided by the SHG is subjected to photo-electric conversion by a photo-multiplier 6.

Figure 2:
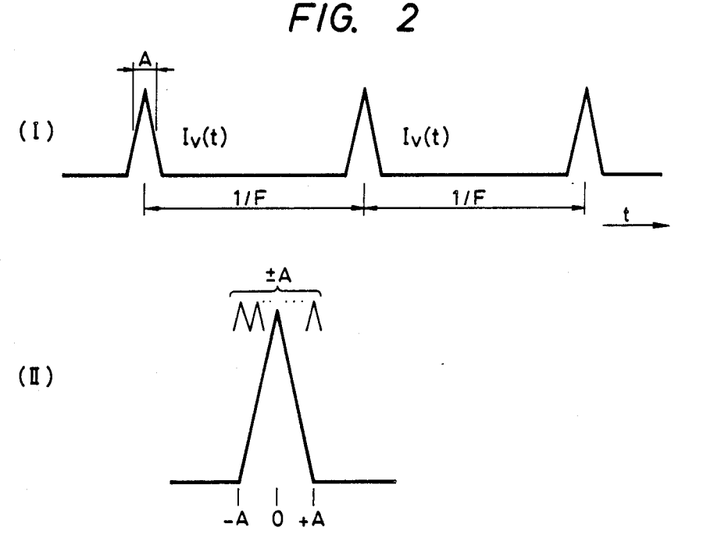
FIG. 2 is a graphical representation of a laser pulse train for use in describing the operation of the device of FIG. 1.

The operation of the device thus organized will be described with reference to the results of the computer simulation which has been carried out with the following model. That is, it is assumed that there is a triangular wave A in full width at half maximum (or time width), and an ideal pulse train having a repetitive frequency F and having no jitter is provided. The ideal pulse train is as shown in the part (I) of FIG. 2.

In the device shown in FIG. 1, the first optical path system is formed (with the total reflection mirror 2 at the position $P_0$). One optical path of the first optical path system is deviated as much as $\tau$ from the other optical path by the first adjusting means 8, 10. In FIG. 1, one position of the total reflection mirror 10 corresponds to one $\tau$.

The total reflection mirror 10 is displaced in a range of $\pm A \times C$ (where C is the speed of light), and the resultant output is recorded for each position (the optical path difference being twice the movement of the total reflection mirror). Theoretically the output can be considered as the auto-correlation of one pulse; however, in the device it is recorded as the average of the auto-correlations of a number of pulses.

With the delay time $\tau$ due to the optical path difference of the two split beams, the auto-correlation degree $G(\tau)$ can be represented by the following expression:

$$G(\tau) = c \int_{-\infty}^{\infty} Iv(t)Iv(t+\tau)dt$$

where c is the constant, and Iv (t) is the function indicating the waveform of the aforementioned model.

Figure 3:
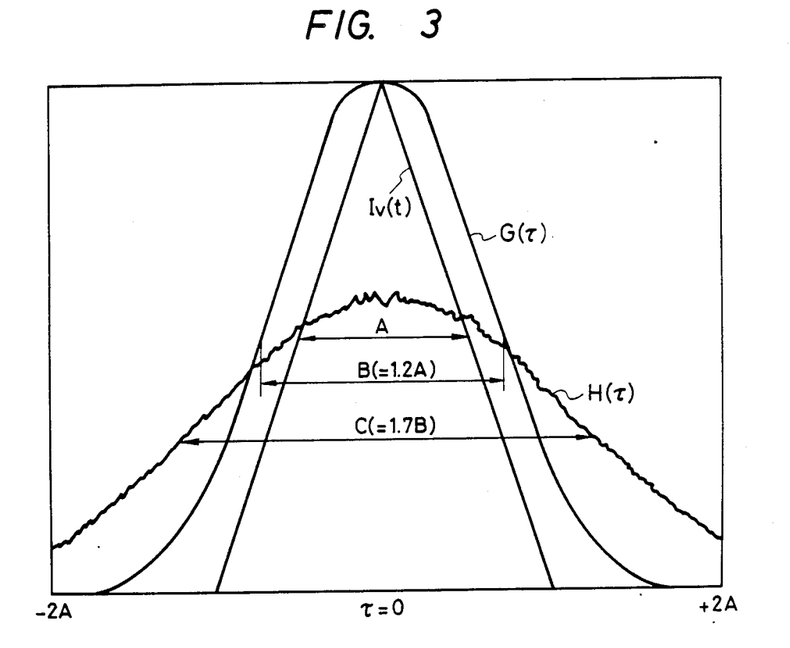
FIG. 3 is a graphical representation of the outputs provided in the simulation of the operation of the device of FIG. 1.

FIG. 3 indicates the auto-correlation degree $G(\tau)$ with the function Iv (t). In FIG. 3, the auto-correlation degree $G(\tau)$ normalized is shown.

The half-amplitude level B of the auto-correlation waveform obtained in the above-described manner is 1.2 times as much as the full width at half maximum A of the function waveform Iv (t); that is, B=1.2 A.

So far, a pulse train having no jitter has been described; however, in the case of auto-correlation, even if the pulse train jitters the same result is obtained as long as the pulse shape is maintained.

Next, as for a triangular wave laser pulse train, a laser pulse train is provided as a model in which the probability of distribution is equal in a range of $\pm A$ for each pulse. That is, in the model of the laser pulse train, triangular wave peaks can occur with equal probability in the range of $\pm A$ shown in the part (II) of FIG. 2.

When, as was described before, with the first optical path system formed, the total reflection mirror 10 is displaced in the range of $\pm A \times C$ and the output is recorded for each position of the mirror, the curve $G(\tau)$ shown in FIG. 3 is obtained.

Next, the second optical path system is formed by moving the total reflection mirror 2 to the position $P_1$. The distance between the positions $P_0$ and $P_1$ corresponds to the distance light travels in one half ($\frac{1}{2}$) of the time corresponding to the pulse interval of a pulse train having no jitter.

Under this condition, the total reflection mirror 10 is moved by the adjusting means drive unit 8, while the output thereof is recorded for each position of the mirror. As a result, the curve $H(\tau)$ shown in FIG. 3 is obtained. The peak value $H(\tau)_{max}$ of the curve $H(\tau)$ is about 0.7 times the peak value $G(\tau)_{max}$. The half-amplitude level of the curve $H(\tau)$ is 1.7 times the half-amplitude level B of the curve $G(\tau)$.

The following can be understood as a result of the above-described computer simulation:

In the case where the pulse train has jitter, the peak of the waveform measured with the second optical path system is lower than that of the waveform measured with the first optical path system.

The full width at half maximum of the waveform measured with the second optical path system is larger than that of the waveform measured with the first optical path system.

In the case where the jitter is large, the peak of the waveform that is measured with the second optical path system is smaller than the peak of the waveform that is measured with the second optical path system when the jitter is small.

Similarly, in the case where the jitter is large, the full width at half maximum of the waveform that is measured with the second optical path system is larger than that of the waveform that is measured with the second optical path system when the jitter is small.

Accordingly, the degree of jitter can be detected by comparing the waveform provided by measuring the laser pulse train with the first optical path system according to the above-described method with the waveform provided by measuring with the second optical path system according to the aforementioned method.

Figure 4:
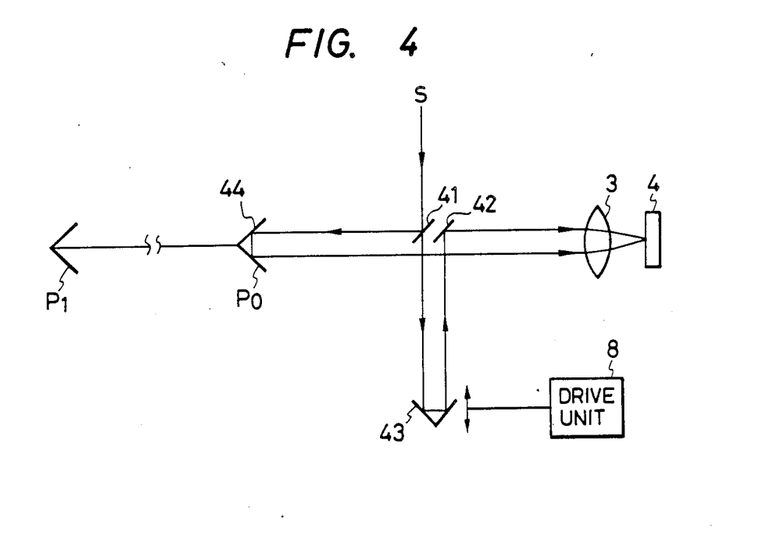
FIGS. 4 through 10 are optical path diagrams showing second through eighth embodiments of the laser pulse train jitter measuring device of the present invention.

FIG. 4 is an optical path diagram showing a second example of the optical path of the laser pulse train jitter measuring device according to the present invention.

A light beam emitted from a laser pulse train source S is split into two parts by a half mirror 41.

When a corner reflector 44 is at position $P_0$ in FIG. 4, the aforementioned first optical path system is formed. When the corner reflector 44 is at a position $P_1$, the second optical path system if formed.

With the first optical path system formed, the light beam reflected by the half mirror 41 is further reflected by the corner reflector 44 at the position $P_0$, and is applied through the lens 3 to the optical crystal 4.

On the other hand, the light beam passing through the half mirror 41 is reflected by another corner reflector 43 and is then reflected by a total reflection mirror 42. The light beam thus reflected is applied to the optical crystal 4 through the lens 3. Thus, the second harmonic component ($2\omega$) of the light beam can be obtained.

The optical path distance adjustment can be achieved by moving the corner reflector 43 vertically in FIG. 4. The corner reflector 43 and the adjusting means drive unit 8 serve as means for adjusting the first and second optical paths.

Figure 5:
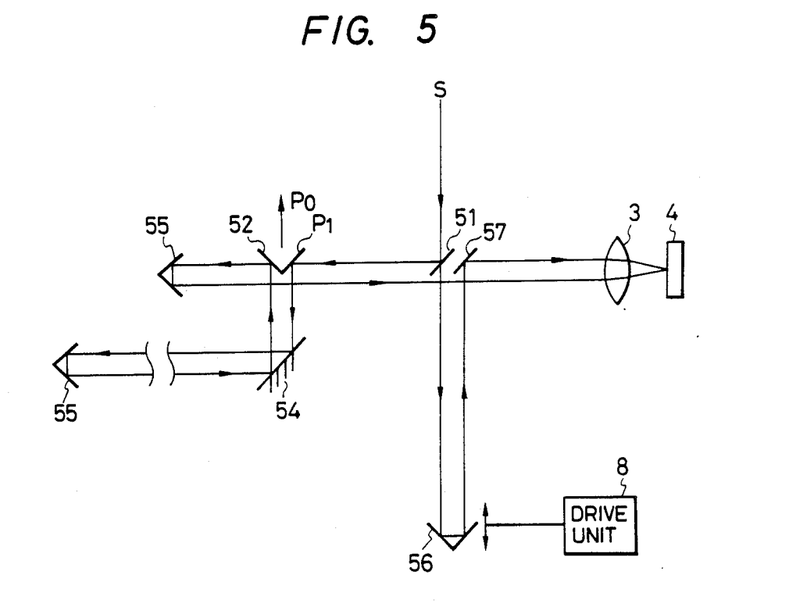

FIG. 5 is an optical path diagram showing a third example of the optical path of the laser pulse train jitter measuring device according to the present invention.

A light beam outputted by the laser pulse train source S is split into two parts by a half mirror 51. When a right-angle reflection mirror 52 having total reflection surfaces that form an anble of 90° with respect to each other is at a position $P_1$, the second optical path system is formed; and when the mirror 52 is moved away from the position, the first optical path system is formed. The light beam reflected by the right-angle reflection mirror 52 at the position $P_1$ is further reflected by a total reflection mirror 54, a corner reflector 55, the total reflection mirror 54, the right-angle reflection mirror 52 and another corner reflection mirror 53 in the stated order. The light beam thus reflected is applied through the lens 3 to the optical crystal 4.

On the other hand, the other of the two parts of the light beam, namely, the light beam passing through the half-mirror 51 is reflected by a corner reflector 56 and a total reflection mirror, and is then applied through the lens 3 to the optical crystal 4.

The corner reflector 56 is moved vertically in FIG. 5 by the adjusting means drive unit 8 to adjust the amount of difference between the optical paths. In the case of FIG. 5, the corner reflector 56 and the adjusting means drive unit 8 serve as means for adjusting the first and second optical paths.

Figure 6:
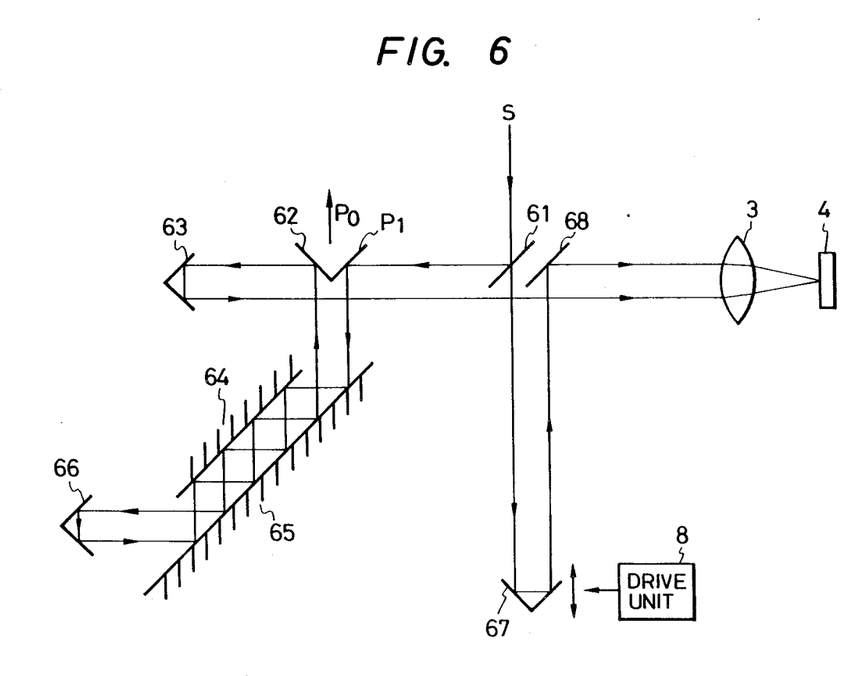

FIG. 6 is an optical path diagram showing a fourth example of the optical path of the laser pulse train jitter measuring device according to the present invention.

A light beam emitted from the laser pulse train source S is split into two parts by a half mirror 61.

When a right-angle reflection mirror 62 having two total reflection surfaces that form an angle of 90° with result to each other is at a position $P_1$ in FIG. 6, the second optical path system is formed; and when it is removed from the position, the first optical path system is formed.

With the first optical path system formed, one of the two parts of the light beam, namely, the light beam reflected by the half-mirror 61 is further reflected by a corner reflector, and is applied through the lens 3 to the optical crystal 4. On the other hand, the other of the two parts, namely, the light beam passing through the half-mirror 61 is reflected by another corner reflector 67 and a total reflection mirror 68, and is applied through the lens 3 to the optical crystal 4.

In the case where the second optical path system is formed as shown in FIG. 6, the light beam reflected by the half-mirror 61 is reflected by the right-angle reflection mirror 62. The light beam thus reflected passes through an optical tunnel formed by the total reflection mirrors 64 and 65, and is then reflected by a corner reflector 66. The light beam thus reflected passes through the optical tunnel in the opposite direction and is reflected by the right-angle reflection mirror 62 again and by the corner reflector 63. The light beam thus reflected is applied through the lens 3 to the optical crystal 4.

In the case of FIG. 6 also, the corner reflector 67 and the adjusting means drive unit 8 serves as means for adjusting the first and second optical paths.

Figure 7:
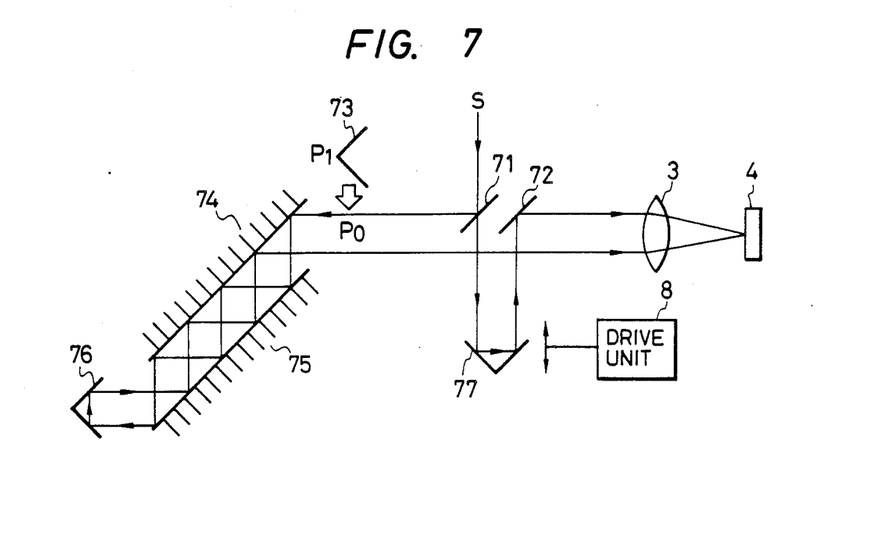

FIG. 7 is an optical path diagram showing a fifth example of the optical path in the laser pulse train jitter measuring device according to the present invention.

In this device, a light beam outputted by the laser pulse train source S is split into two parts by a half mirror 71: one of the two parts is reflected by the half mirror 71 and the other passes through the half mirror 71.

In the device of FIG. 7, the first optical path system is formed when a corner reflector 73 is moved to a position $P_0$. In the device also, the second optical path system is formed by using the reflection mirrors 74 and 75.

In FIG. 7, reference numerals 73, 76 and 77 designate corner reflectors; and 72, a total reflection mirror.

In the device of FIG. 7, the corner reflector 77 and the adjusting means drive unit 8 serve as means for adjusting the first and second optical paths.

Figure 8:
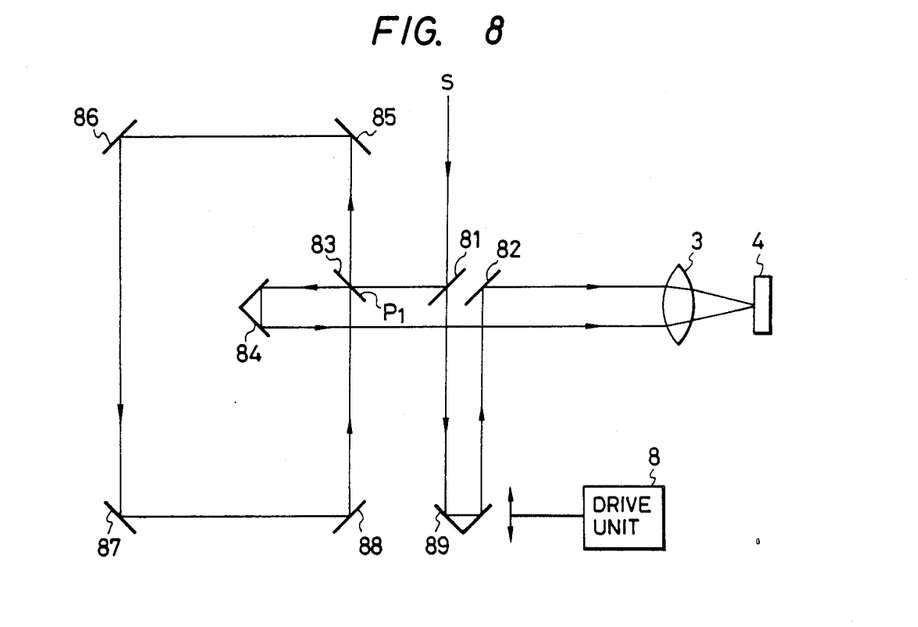

FIG. 8 is an optical path diagram showing a sixth example of the optical path in the laser pulse train jitter measuring device according to the present invention.

In the device, a light beam generated by the laser pulse train source S is split into two parts by a half mirror 81: one of the two parts is reflected by the half mirror 81, and the other passes through the half mirror 81.

In the device, a reflection mirror 83 having front and back surfaces that are total reflection surfaces is at a position $P_1$ to form the second optical path system, and the mirror 83 is removed from the position $P_1$ to form the first optical path system.

In FIG. 8, total reflection mirrors 85, 86, 87, and 88 are used to form the second optical path system. Reference numeral 82 designates a total reflection mirror.

In the device of FIG. 8, a corner reflector 89 and the adjusting means drive device 8 serve as means for adjusting the first and second optical paths.

Figure 9:
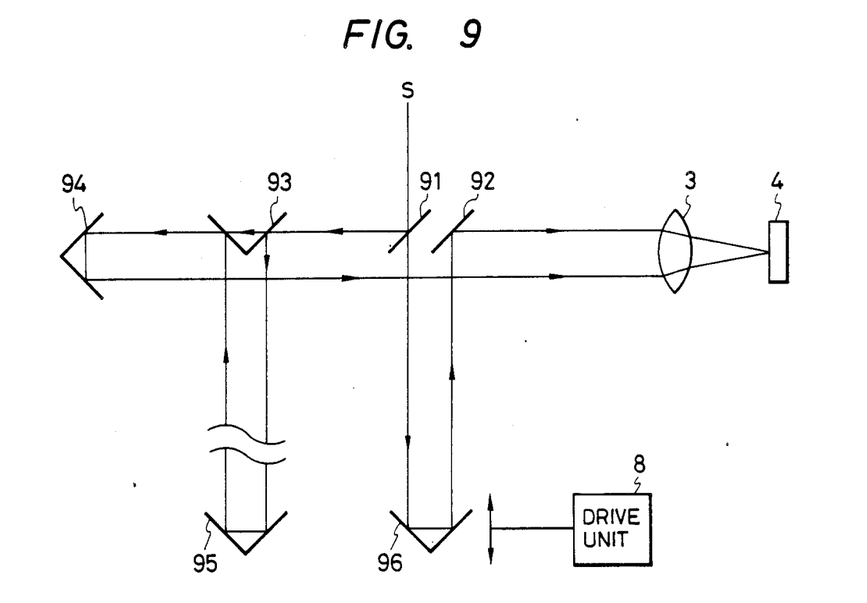

FIG. 9 is also an optical path diagram showing a seventh example of the optical path in a laser pulse train jitter measuring device according to the present invention.

In the device, a light beam produced by the laser pulse train source S is split into two parts by a half-mirror 91: that is, a part of the light beam is reflected by the half-mirror 91, and the remaining part passes through the half-mirror 91.

In the device of FIG. 9, the first and second optical path systems are simultaneously formed by using a right-angle beam splitter 93.

In FIG. 9, reference numerals 94, 95 and 96 designate corner reflectors; and 92, a total reflection mirror.

In the first optical path system, the light beam passes through the right-angle beam splitter 93, while in the second optical path system the light beam is reflected by the splitter 93.

In the device, the corner reflector 96 and the adjusting means drive unit 8 serve as means for adjusting the first and second optical paths. In the device, the corner reflector 96 must be able to cover the ranges of adjustment of the optical path systems.

If, in the device, the difference between the first and second optical distances is a value that causes a time delay expectly equal to one pulse interval, then the curves $G(\tau)$ and $H(\tau)$ become similar to each other. Therefore, the difference should be somewhat deviated from that value.

Figure 10:
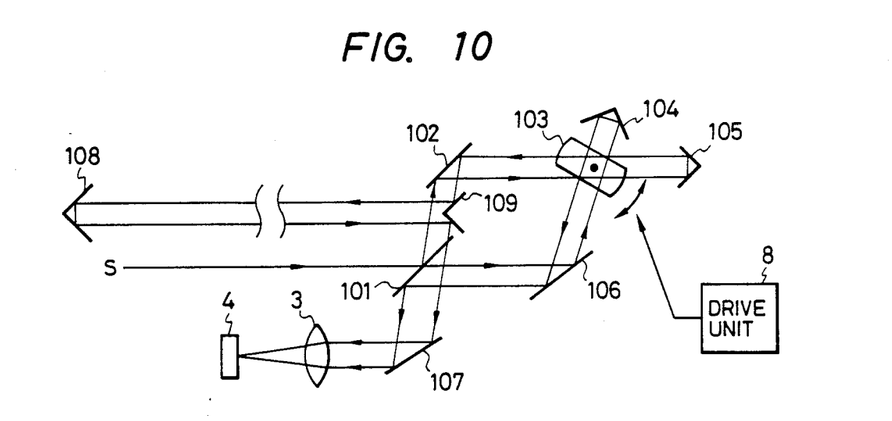

FIG. 10 is an optical path diagram showing an eighth example of the optical paths in the laser pulse train jitter measuring device according to the present invention.

In the device, a light beam outputted by the laser pulse train source S is divided into two parts by a half-mirror 101: that is, a part of the light beam is reflected by the half-mirror 101, and the remaining part passes through the half-mirror 101.

In the device of FIG. 10, the second optical path system is formed when a right-angle reflection mirror 109 is positioned as shown in FIG. 10, and the first optical path system is formed when the mirror 109 is removed therefrom.

In FIG. 10, reference numerals 102, 106 and 107 designate total reflection mirrors; and 104, 105, 108 and identify corner reflectors.

In the device, a rotary prism 103 is provided so that it is rotatable around its axis. The lengths of the optical paths change with the direction of transmission of light, and the relative length of each optical path can be adjusted by turning the rotary prism 103. The rotary prism 103 and the adjusting means drive unit 8 serve as means for adjusting the difference in the lengths of the first and second optical paths.

In the case where the first optical path system has been formed, the light beam passing through the half-mirror 101 is reflected by the total reflection mirror 106, so that it passes through the prism 103 from below. Thereafter, the light beam is reflected by the corner reeflector 104, so that it passes through the prism 103 from above. The light beam is then reflected by the total reflection mirror 106, the half-mirror 101, and the total reflection mirror 107 in the stated order, and is applied through the lens 3 to the optical crystal 4.

On the other hand, the light beam reflected by the half-mirror 101 is reflected by the total reflection mirror 102 and passes through the prism 103 from the left. Thereafter, the light beam is reflected by the corner reflector 105, passes through the prism 103 from the right, passes through the half mirror 101 and is reflected by the total reflection mirrors 102 and 107. The light beam thus reflected is applied through the lens 3 to the optical crystal 4.

The difference between the above-described two optical paths can be adjusted by turning the prism 103.

In the case where the second optical path system has been formed, the light beam passed through the half-mirror 101 is reflected by the total reflection mirror 106 and passes through the prism 103 from below. Thereafter, the light beam is reflected by the corner reflector 104 and passes through the prism 103 from above. The light beam is then reflected by the total reflection mirror 106, the half-mirror 101, and the total reflection mirror 107 in the stated order, so that it is applied through the lens 3 to the optical crystal 4.

On the other hand, the light beam that is reflected by the half-mirror 101 is reflected by the total reflection mirror 102, so that it passes through the prism 103 from the left. Thereafter, the light beam is reflected by the corner reflector 105, so that it passes through the prism 103 from the right. The light beam is further reflected by the total reflection mirror 102, the right-angle reflection mirror 109, the corner reflector 108, the right-angle reflection mirror 109, passes through the half mirror 101 and the total reflection mirror 107 in the stated order, so that it is applied through the lens 3 to the optical crystal 4.

The difference between the above-described two optical paths can be adjusted by turning the prism 103, similarly as in the above-described case.

In addition to the aforementioned ADP ($NH_4H_2PO_4$—ammonium dihydrogen phosphate), KDP($KH_2PO_4$—potassium dihydrogen phosphate), $KD^*P(KD_2PO_4)$, $LiNbo_3$, KPB, or $LiIO_3$ may be employed as the non-linear optical crystal. Furthermore, a cube beam splitter may be used instead of the above-described half-mirror in the optical path.

In the laser pulse train jitter measuring devices shown in FIGS. 4 through 10, the optical paths are of a non-collineation system; however, the optical paths of a collineation system as shown in FIG. 1 may be formed by using the optical elements shown in FIGS. 4 through 10.

While several embodiments of the invention have been described in detail, it should be noted that the invention is not limited thereto or thereby; that is, it would be apparent to those skilled in the art that various changes and modifications may be made therein without departing from the scope and spirit invention of the invention as set forth in the following claims.

What is claimed is:

1. A laser pulse train jitter measuring device comprising:
   a source of a laser beam to be measured for jitter;
   a first optical path;
   a second optical path;
   means for receiving said laser beam from said source and for splitting said laser beam into a first split beam directed to said first optical path and a second split beam directed to said second optical path;
   means for setting said first optical path to a first path length or a second path length;
   means for varying the length of said second optical path from a first value to a second value;
   means for producing a correlated beam by recombining said first split beam and said second split beam after said first split beam has traversed said first optical path and said second split beam has traversed said second optical path;
   means for providing the second harmonic of said correlated beam;
   means for producing a photo-electric signal corresponding to said second harmonic of said correlated beam; and
   recording means for producing a first recording of said photo-electric signal corresponding to said correlated beam produced when said first optical path has said first path length while said length of said second optical path is varied from said first value to said second value, and a second recording of said photoelectric signal corresponding to said correlated beam produced when said first optical path has said second path length while said length of said second optical path is varied from said first value to said second value, whereby comparison of said first recording and said second recording enables the measurement of jitter in said laser beam.

2. A device according to claim 1, wherein said providing means comprises a second harmonic generator, including:
   a crystal for receiving said correlated beam and for outputting the dominant wave length component and said second harmonic thereof; and
   a band-pass filter for removing from said correlated beam said dominant wavelength component outputted by said crystal.

3. A device according to claim 2, wherein said crystal is one selected from the group consisting of ADP ($NH_4H_2PO_4$—ammonium dihydrogen phospate), KDP($KH_2PO_4$— potassium dihydrogen phosphate), $KD^*P(KD_2PO_4)$, $LiNbo_3$, KPB, or $LiIO_3$.

4. A device according to claim 1, wherein said first optical path includes a first reflecting surface positionable at a first position to set said first path length or at a second position to set said second path length.

5. A device according to claim 4, wherein said second optical path includes a second reflecting surface and a drive unit for moving said second reflecting surface between a first point and a second point in said second optical path to vary the length thereof between said first value and said second value.

6. A device according to claim 5, wherein said first reflecting surface and said second reflecting surface comprise total reflection mirrors.

7. A device according to claim 1, wherein said second optical path includes:
   an optical path length adjustment element wherein the refractive index thereof depends upon the direction of light transmission therethrough; and
   drive means for rotating said element to change the refraction of said second split beam such that the effective length of said second optical path varies from said first value to said second value.

8. A device according to claim 7, wherein said element comprises a rotatable prism.

9. A device according to claim 1, wherein said source comprises a dye laser.

10. A device according to claim 1, wherein said receiving and splitting means and said recombining means comprise a half-mirror.

* * * * *